United States Patent [19]

Idel

[11] 3,985,048
[45] Oct. 12, 1976

[54] GRINDING BAND SAW TEETH

[76] Inventor: Vladimir Viktorovich Idel, ulitsa Gertsena 3, kv. 37, Zavolzhie Gorkovskoi oblasti, U.S.S.R.

[22] Filed: Dec. 11, 1974

[21] Appl. No.: 531,722

[30] Foreign Application Priority Data

| | | |
|---|---|---|
| Dec. 11, 1973 | U.S.S.R. | 1973055 |
| Dec. 11, 1973 | U.S.S.R. | 1973057 |
| Dec. 11, 1973 | U.S.S.R. | 1973058 |
| Jan. 3, 1974 | U.S.S.R. | 1979651 |
| Jan. 3, 1974 | U.S.S.R. | 1979652 |
| Jan. 3, 1974 | U.S.S.R. | 1979653 |
| Jan. 3, 1974 | U.S.S.R. | 1979654 |
| Jan. 3, 1974 | U.S.S.R. | 1979655 |
| Jan. 3, 1974 | U.S.S.R. | 1979656 |
| Jan. 3, 1974 | U.S.S.R. | 1979657 |
| Mar. 12, 1974 | U.S.S.R. | 2006506 |
| Mar. 12, 1974 | U.S.S.R. | 2006507 |
| Mar. 12, 1974 | U.S.S.R. | 2006508 |
| Mar. 12, 1974 | U.S.S.R. | 2006509 |
| Mar. 12, 1974 | U.S.S.R. | 2006510 |
| June 24, 1974 | U.S.S.R. | 2032127 |

[52] U.S. Cl. ............................ 76/43; 76/77
[51] Int. Cl.$^2$ ............................ B23D 63/00
[58] Field of Search ............. 76/37, 41, 43, 51, 54, 76/72, 74, 77, 112

[56] References Cited
UNITED STATES PATENTS

| | | | |
|---|---|---|---|
| 1,817,082 | 8/1931 | Judt | 76/41 |
| 2,434,691 | 1/1948 | Fields | 76/37 |
| 3,657,946 | 4/1972 | Idel et al. | 76/43 |

*Primary Examiner*—Al Lawrence Smith
*Assistant Examiner*—Nicholas P. Godici
*Attorney, Agent, or Firm*—Haseltine, Lake & Waters

[57] ABSTRACT

Apparatus employing a reciprocating feed of a band saw to an abrasive wheel and a pitch feed of the saw to the abrasive wheel. The saw is positioned so that during a part of the pitch feed the portion of the tooth back edge adjacent to the tooth tip comes into contact with one shaped surface of a supporting element, whereby the saw is retarded and at the same time this portion of the tooth edge is strengthened and planished. During the remaining part of the pitch feed, the portion of the tooth front edge adjacent to the tooth tip makes contact with the other shaped surface of the supporting element, whereby this portion of the tooth front edge is strengthened and planished. In the machine, as viewed in the direction of the pitch feed, two shaped surfaces are disposed in relation to each other so as to form a wedge.

18 Claims, 20 Drawing Figures

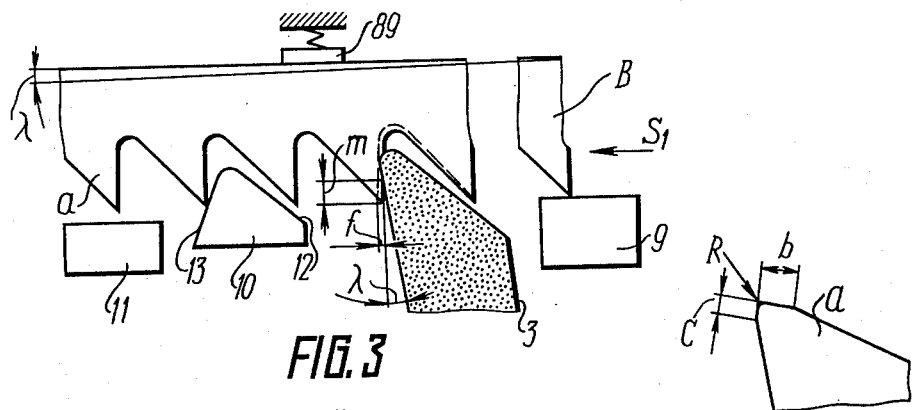
FIG. 3
FIG. 4
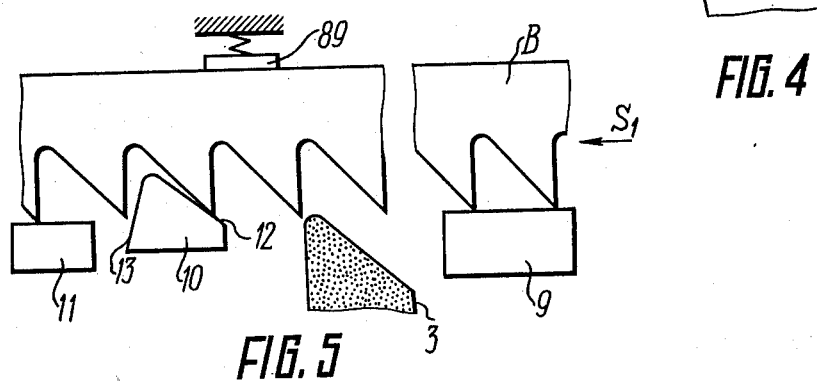
FIG. 5

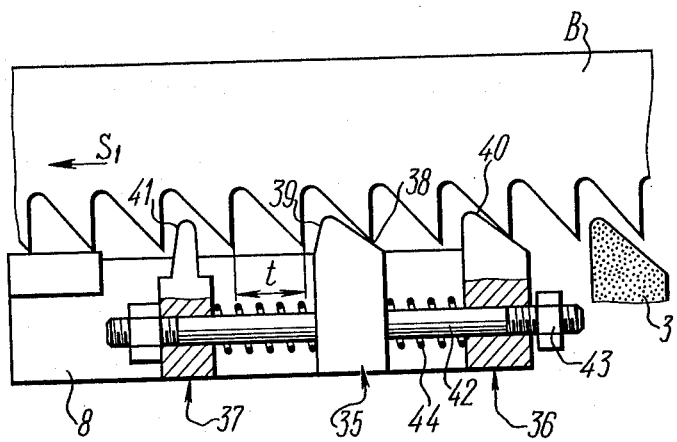
FIG. 8
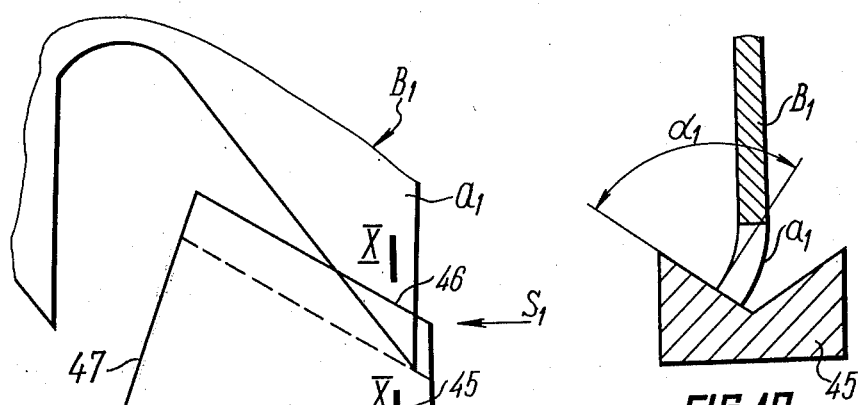
FIG. 9
FIG. 10

GRINDING BAND SAW TEETH

The present invention relates to apparatus for grinding band saw teeth.

Known in the art is apparatus for grinding band saw teeth whereby the saw is fed to an abrasive wheel for grinding the back and front edges of adjacent teeth. After this grinding is done, the saw is given a pitch feed, i.e. it is moved relatively to the abrasive wheel by the amount of the tooth pitch. During the pitch feed the saw is retarded in the following manner: the tooth back edge portion adjacent to the tooth tip is brought into contact with a supporting element positioned after the abrasive wheel, as viewed in the direction of the pitch feed. As a result of this, each tooth being ground is oriented in relation to the abrasive wheel (see, for example, U.S. Pat. No. 3,657,946).

As known in the art are machines for grinding saw band teeth which comprise a bed mounting a grinding mechanism with an abrasive wheel, a mechanism for imparting to the saw a reciprocating feed to the abrasive wheel for the purpose of grinding the front and back edges of adjacent teeth, and a mechanism for imparting to the saw a pitch feed to the abrasive wheel after the front and back edges of the adjacent teeth have been ground.

The reciprocating feed mechanism and the pitch feed mechanism are kinematically interconnected. Mounted on the reciprocating feed mechanism is a resilient fixture arranged to retain the saw at the side and back surfaces during the grinding process. Said fixture mounts three supporting elements. One (rear) element is positioned before the abrasive wheel, as viewed in the direction of the pitch feed. The two other elements are positioned after the abrasive wheel, as viewed in the direction of the pitch feed, being located some distance one after the other.

The supporting element located after the abrasive wheel and next thereto is positioned at the minimum possible distance from said abrasive wheel, approximately one or two tooth pitches away. These supporting elements have a shaped surface inclined relatively to the direction of the pitch feed. Said surface interacts successively with the tip of each tooth, more particularly with the tooth back edge portion adjacent to the tooth tip. The inclination of said surface enables the saw to be retarded during a high-speed pitch feed, whereby the saw teeth are orientated in relation to the abrasive wheel. The retardation is produced by the horizontal reaction force component arising on the inclined surface. Furthermore, simultaneously with the retardation during the pitch feed the tooth back edge portion adjacent to the tooth tip becomes strengthened and planished (see, for example, U.S. Pat. No. 3,802,299).

With the employment of the saw tooth grinding machines described above, only the tooth back edge portion adjacent to the tooth tip becomes strengthened and planished. The front edge of the tooth does not receive the strengthening treatment which results in inferior quality of the tooth surface finish and, consequently, in a shorter saw life. With this method of saw tooth grinding, the tip (cutting edge) of each tooth receives a surface finish of Class 6–8.

It is an object of the present invention to eliminate the disadvantages described above.

It is a specific object of the present invention to provide apparatus for grinding band saw teeth and a machine whereby during the pitch feed of the saw to the abrasive wheel each tooth of the saw is strengthened and planished on the portions of the front and back edges adjacent to the tooth tip.

A further object of the present invention is to improve the surface finish of the saw teeth involved.

A still further object of the present invention is to lengthen the life of the saws involved.

These and other objects are achieved by apparatus for grinding band saw teeth, employing a reciprocating feed of the saw to an abrasive wheel for the purpose of grinding the front and back edges of adjacent teeth and a pitch feed of the saw to said abrasive wheel, during which pitch feed the saw is retarded by successively bringing each saw tooth into contact with a supporting element positioned after said abrasive wheel, as viewed in the direction of said pitch feed, the contact being made on the portion of the tooth back edge adjacent to the tooth tip. According to the invention, said supporting element has two shaped surfaces disposed at an angle to each other and the saw is positioned so that first said portion of the tooth back edge comes into contact with one shaped surface of the supporting element during a part of the pitch feed and then, during the remaining part of the pitch feed, the portion of the tooth front edge adjacent to the tooth tip is brought into contact with the other shaped surface of the supporting element, whereby said portions of each tooth are strengthened and planished.

To carry the above into effect, there is provided a band saw tooth grinding machine the bed of which mounts a grinding mechanism with an abrasive wheel, a mechanism for imparting the saw a reciprocating feed to said abrasive wheel, said mechanism being kinematically connected with a mechanism for imparting the saw a pitch feed to said abrasive wheel, and a resilient fixture arranged to retain the saw at the side and back surfaces and carrying at least two supporting elements positioned one after and the other before said abrasive wheel, as viewed in the direction of the pitch feed. According to the invention, the supporting element positioned after the abrasive wheel has two shaped surfaces disposed so as to form a wedge. One of said surfaces interacts during the pitch feed of the saw with the tooth back edge portion adjacent to the tooth tip, whereas the other surface interacts during the pitch feed of the saw with the tooth front portion adjacent to the tooth tip.

It is desirable for the supporting element with shaped surfaces to be mounted so that it can make a reciprocating movement in the direction of the saw pitch feed.

Mounting the supporting element in such a manner permits increasing the length of the planished portion of the tooth front edge without changing the tooth front angle.

It is also desirable for the machine to have two additional supporting elements with shaped surfaces. Said additional supporting elements should be mounted at the opposite sides of the aforementioned supporting element, as viewed in the direction of the saw pitch feed, and articulated thereto, said aforementioned supporting element being fixedly mounted on the resilient fixture.

The use of additional supporting elements permits planishing the portions of the back and front edges on three teeth simultaneously, thereby increasing the degree of strengthening of each tooth.

It may also be desirable for the machine to have two additional supporting elements mounted at the opposite sides of the aforementioned supporting element, as viewed in the direction of the saw pitch feed, said aforementioned supporting element being fixedly mounted on the resilient fixture. The additional supporting element mounted before the aforementioned supporting element, as viewed in the direction of the saw pitch feed, should have a shaped surface arranged to make contact with the portion of the tooth back edge. The additional supporting element mounted after the aforementioned supporting element, as viewed in the direction of the saw pitch feed, should have a shaped surface arranged to make contact with the portion of the tooth front edge.

The supporting elements constructed as described above are recommended for use in band saw tooth grinding machines wherein the forces acting on the saw back side are considerably small.

If the teeth to be ground are bent in relation to the saw side surface, the surface of the supporting element designed to make contact with the portion of the tooth back edge must be V-shaped.

It is advantageous to provide a stop on the bed in the zone of saw pitch feed movement, said stop being adapted to periodically make contact with the back side of the saw in order to limit saw displacement during the movement of the saw away from the abrasive wheel.

The provision of a stop to limit saw displacement permits keeping the saw mounted in a floating manner in all modes of operation of the machine.

It is most advantageous to mount said stop on the bed after the resilient fixture, as viewed in the direction of the saw pitch feed. It is also most simple to locate said stop after the resilient fixture for constructional reasons. It is feasible to make each shaped surface of the supporting element corrugated across the direction of the saw pitch feed. The provision of corrugations on the shaped surface permits increasing the dynamic action on the saw tooth being strengthened. The corrugations may be half-round in cross section for manufacturing reasons.

It is most advantageous to make corrugations having a cross-sectional shape in the form of a scalene triangle whose larger side faces against the direction of the pitch feed and provides a contact face for interaction with the saw teeth.

The employment of such corrugations makes it possible to produce the back and front tooth edges with planished portions of various length and various degree of strengthening the surface metal layer.

It is desirable that the contact faces on each shaped surface be of equal length, the angle between each succeeding contact face and the imaginary plane perpendicular to the direction of the pitch feed being smaller than the angle between the preceding contact face and said imaginary plane.

The supporting element with such shaped surfaces is to be employed in machines wherein the saw has a swinging movement relatively to the supporting elements. Said shaped surfaces provide for uniform strengthening of the surface metal layer throughout the length of the pertinent portions of the tooth back and front edges.

It may be feasible to form the corrugations in such a manner that each succeeding contact face on each shaped surface is somewhat longer than the preceding contact face, the angle between each succeeding contact face and the imaginary plane perpendicular to the direction of the pitch feed being smaller than the angle between the preceding contact face and said imaginary plane.

With this construction of the shaped surfaces, the surface finish of the tooth portions involved is improved in addition to uniform strengthening.

Another embodiment is possible wherein on each shaped surface each succeeding contact face, as viewed in the direction of the pitch feed, is somewhat shorter than the preceding contact face, the angle between each succeeding contact face and the imaginary plane perpendicular to the direction of the pitch feed being somewhat larger than the angle between said plane and the preceding contact face.

This construction of the shaped surfaces provides for maximum strengthening of the surface metal layer in the zone of the tooth cutting edge.

It may also be desirable that the contact faces on each shaped surface should have equal lengths and make the same angle with the imaginary plane perpendicular to the direction of the pitch feed.

The supporting element with such shaped surfaces is to be used in machines wherein the saw has a transverse movement in relation to the supporting elements.

Such shaped surfaces provide for uniform strengthening of the surface metal layer throughout the length of the portion of the tooth front and back edges.

It may also be desirable that on each shaped surface the length of the first and last contact faces, as viewed in the direction of the pitch feed, be approximately one and a half times the length of the contact faces located therebetween.

This construction of the shaped surfaces simplifies the setting-up of the machine and improves the surface finish of the planished portions of the tooth edges.

We find it desirable that on each shaped surface the second contact face, as viewed in the direction of the pitch feed, should be provided with corrugations whose pitch does not exceed the maximum length of the tooth edge portion making contact with the appropriate shaped surface of the supporting element. Said corrugations should be positioned across the direction of the saw pitch feed and have a triangular cross section.

Provision of said corrugations on the second contact face permits increasing the length of the strengthened portion of the tooth back and front edges.

It is necessary that the second contact face of the shaped surface making contact with the portion of the tooth front edge should have a radius of curvature substantially equal to the distance between the supporting elements, with the centre offset in the direction of the saw feed to the abrasive wheel with respect to the supporting element located before the abrasive wheel, as viewed in the direction of the pitch feed.

Such a supporting element is to be used in machines wherein the saw has a swinging movement relative to the supporting elements.

It is feasible that the top of the supporting element should have a rounded surface corrugated across the direction of the pitch feed, the pitch of the corrugations being substantially equal to the length of the tooth edge portion making contact with the shaped surface of the supporting element.

Such a construction of the supporting element provides for maximum strengthening of the tooth cutting edge and improvement in the tooth surface finish.

The apparatus for grinding band saw teeth according to the present invention, provide for substantial improvement in the surface finish of the saw teeth in the tip zone, making it possible to obtain a surface finish of Class 8-10 and at the same time to strengthen the surface layer of the metal, thereby considerably increasing saw life.

The band saw tooth grinding machine constructed according to the present invention practically has zero idle stroke.

Now embodiments of the invention will next be described in detail with reference to the accompanying drawings in which.

Figure 6:
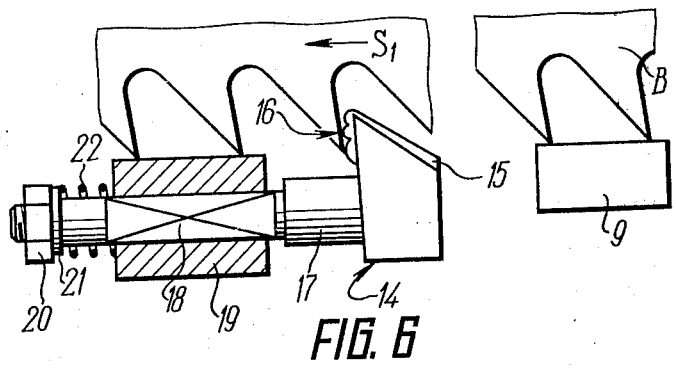
Figure 7:
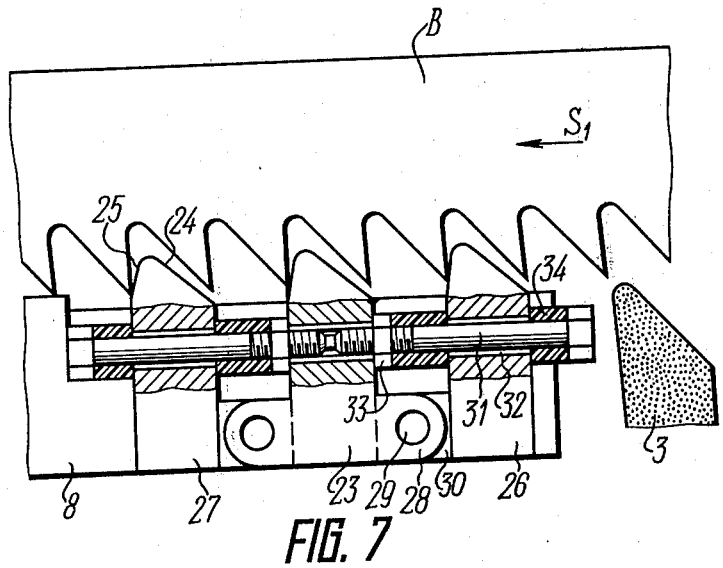
Figure 11:
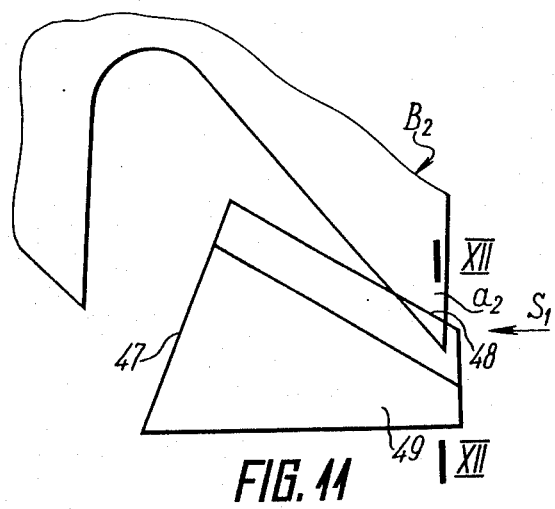
Figure 12:
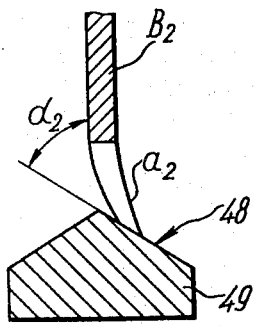
Figure 13:
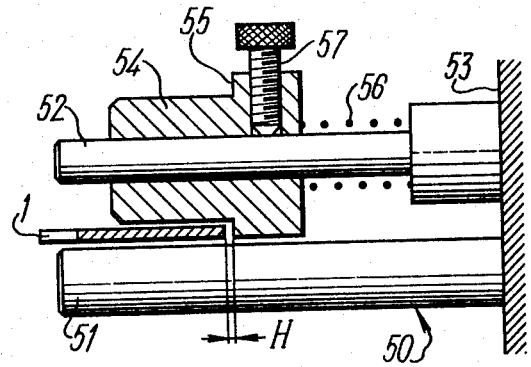
Figure 14:
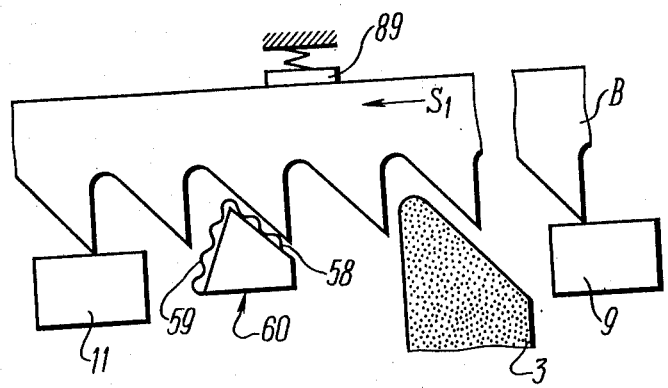
Figure 15:
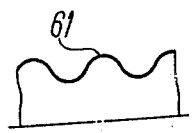
Figure 16:
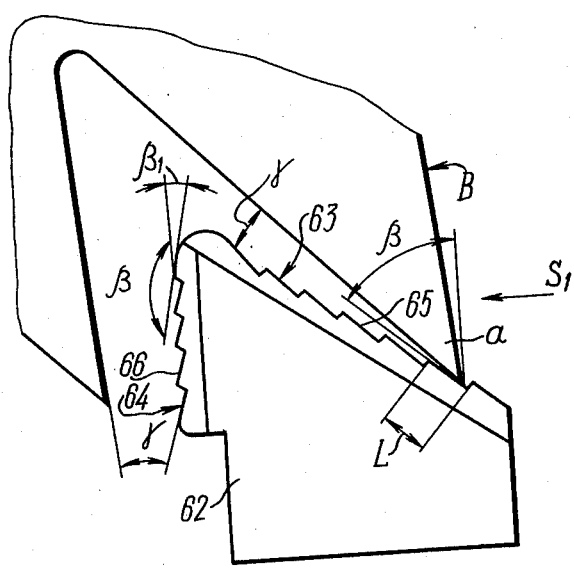
Figure 18:
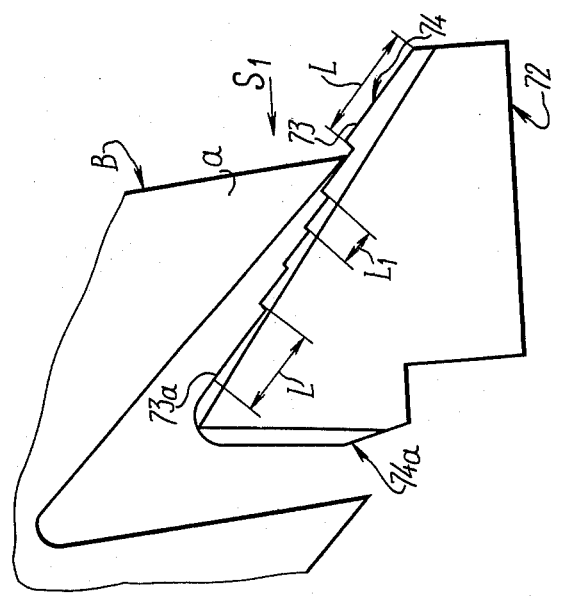
Figure 17:
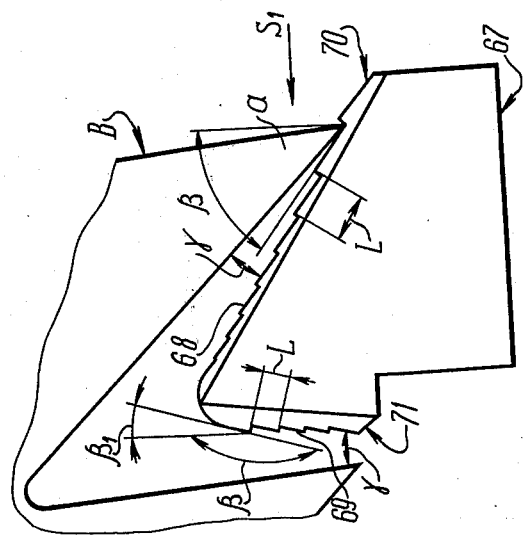
Figure 21:
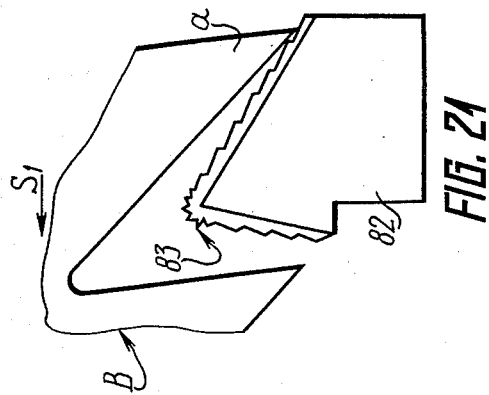
Figure 20:
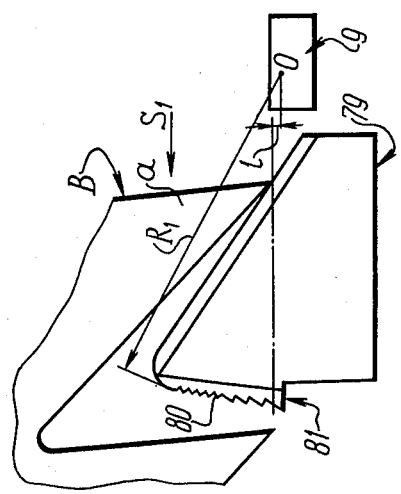
Figure 19:
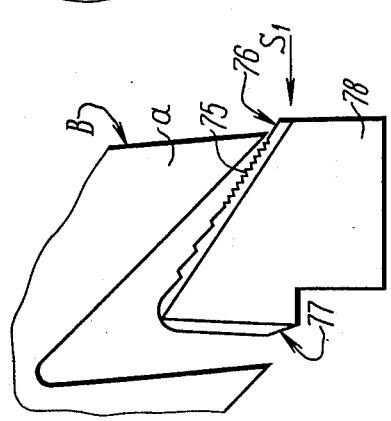

FIG. 3 diagrammatically shows the position of the supporting element with shaped surfaces at the instant of contacting the portion of the tooth front edge;

FIG. 4 shows an enlarged view of a saw tooth;

FIG. 5 diagrammatically shows the position of the supporting element with shaped surfaces at the instant of contacting the portion of the tooth back edge;

FIG. 6 is a diagrammatic view of the supporting element with shaped surfaces;

FIG. 7 shows three supporting elements with shaped surfaces;

FIG. 8 shows another embodiment of the supporting elements with shaped surfaces;

FIG. 9 is a plan view of the supporting element with a V-shaped surface;

FIG. 10 is a section on the line X—X of FIG. 9;

FIG. 11 is a plan view of the supporting element with the surface shaped as an inverted V;

FIG. 12 is a section on the line XII-XII of FIG 11;

FIG. 13 shows a stop interacting with the back surface of the saw;

FIG. 14 shows a supporting element with corrugated surfaces;

FIG. 15 shows an enlarged view of the corrugations;

FIG. 16 shows a supporting element with corrugations in the form of scalene triangles;

FIG. 17 shows another embodiment of a supporting element with corrugations in the form of scalene triangles;

FIG. 18 shows one more embodiment of a supporting element with corrugations in the form of scalene triangles;

FIG. 19 shows a supporting element whereon the second contact face of each shaped surface is corrugated;

FIG. 20 shows another embodiment of a supporting element whereon the second contact face of each shaped surface is corrugated;

FIG. 21 shows a supporting element with a corrugated top.

This invention provides for grinding teeth $a$ (FIG. 1) of a band saw B as will be disclosed in detail in relation to a machine for carrying this into effect.

The machine for grinding the teeth $a$ of the band saw B has a bed 1 which mounts a grinding mechanism 2 with an abrasive wheel 3. Also mounted on the bed 1 is a mechanism 4 for imparting the saw B a reciprocating feed to the abrasive wheel 3 for the purpose of grinding the front and back edges of adjacent teeth $a$.

Figure 2:
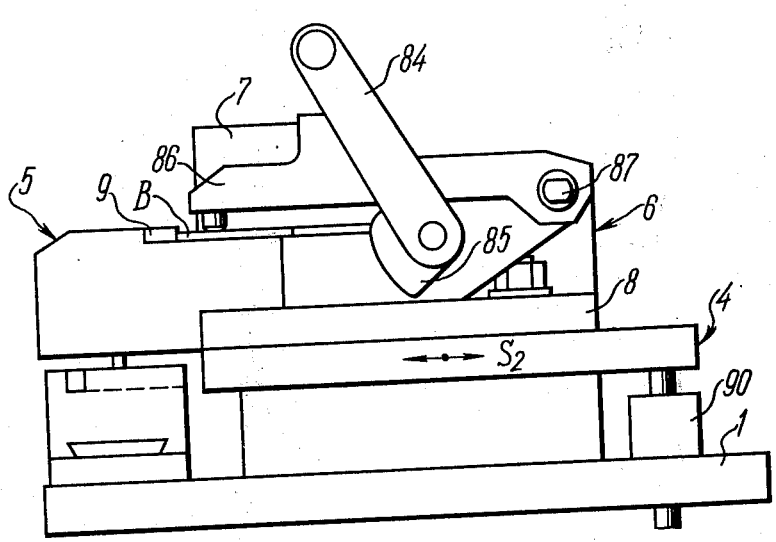
FIG. 2 is a view in the direction of the arrow A in FIG. 1.

Mounted on the mechanism 4 is a pitch feed mechanism 5. The mechanisms 4 and 5 are kinematically interconnected in such a manner that, after the edges of the adjacent teeth have been ground, the saw B is fed to the abrasive wheel 3 by the amount of the tooth pitch. Mounted on the abrasive wheel 3 is a resilient fixture 6 arranged to retain the saw B at the side and back surfaces while the teeth $a$ are being ground. The fixture 6 consists of two parts, viz. an upper part 7 (FIG. 2) and a lower part 8 arranged to clamp the saw B therebetween.

The saw teeth $a$ bear on supporting elements 9 (FIG. 1), 10 and 11 which are mounted on the lower part 8 of the fixture 6.

The supporting element 9 is located before the abrasive wheel 3, as viewed in the direction of the pitch feed indicated by the arrow $S_1$. The supporting elements 10 and 11 are located after the abrasive wheel 3, as viewed in the direction of the pitch feed.

The supporting element 10 is positioned at the minimum possible distance from the abrasive wheel 3, said distance being approximately equal to one or two tooth pitches of the saw B.

The supportingg element 10 has shaped surfaces 12 and 13 (FIG. 3) disposed so as to form a wedge. The surface 12 is adapted to make contact, during the pitch feed of the saw B, with the portion $b$ (FIG. 4) of the back edge of the tooth $a$, said portion $b$ being adjacent to the tooth tip. The length of the portion $b$ is within 0.5 - 2 mm. The surface 13 (FIG. 3) is adapted to make contact with the portion $c$ (FIG. 4) of the front edge of the tooth $a$. The length of the portion $c$ is 0.5 - 2 mm.

In this embodiment of the invention, the surfaces 12 and 13 are flat. Before the grinding operation the saw is mounted so that the top of the supporting element 10 is in the space between adjacent teeth $a$, the shaped surface 13 (FIG. 3) contacting the portion $c$ (FIG. 4) of the tooth back edge. During a part of the pitch feed of the saw B, the portion $b$ of the back edge of the tooth $a$ moves on the shaped surface 12 (FIG. 3). By virtue of this movement the surface layer of the metal is strengthened and planished. The planishing so produced improves the surface finish. During the remaining part of the pitch feed the portion $c$ (FIG. 4) of the front edge of the tooth $a$ comes into contact with the shaped surface 13 (FIG. 5) and is also strengthened and planished.

The top of the supporting element 10 is rounded. When the cutting edge (tip) R (FIG. 4) of the tooth moves over said top of the supporting element 10, it is strengthened and planished, becoming rounded off by hundredths or thousands of a millimeter.

The strengthening and planishing of the portions $b$ and $c$ of the appropriate edges of the tooth $a$ results in a slight variation in the angle of inclination of said tooth edges as shown in FIG. 4.

Figure 1:
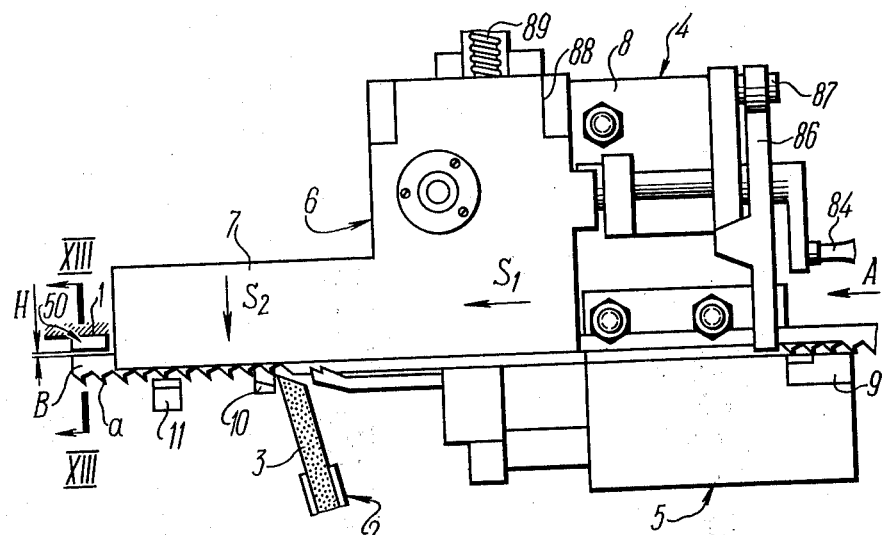
FIG. 1 shows a plan view of the band saw tooth grinding machine constructed according to the invention.

If variation in the angle of inclination of the tooth front edge is objectional, a supporting element 14 (FIG. 6) with shaped surfaces 15 and 16 is mounted so that it can make a reciprocating movement in the direction $S_1$ of the pitch feed. For the purpose the supporting element 14 is mounted on a stem 17. Fitted approximately in the middle of the stem 17 are guides 18 of square cross section. The guides 18 hold the stem 17 in a housing 19 which is fixedly mounted to the lower part 8 of the resilient fixture 6 (FIG. 1).

The other end of the stem 17 has a thread onto which is installed a nut 20 and a washer 21. Fitted between the washer 21 and the housing 19 is a damping element 22 (for example, a spring).

In order to planish and strengthen several teeth $a$ of the saw B simultaneously, use is made of a main supporting element 23 (FIG. 7) with shaped surfaces 24 and 25 and of additional supporting elements 26 and 27 with shaped surfaces 24 and 25. Said supporting elements are located at the opposite sides of the main supporting element 23, as viewed in the direction of the pitch feed. The main supporting element 23 is fixedly mounted to the lower part 8 (FIG. 2) of the resilient fixture 6. The additional supporting elements 26 (FIG. 7) and 27 are connected with the main supporting element 23. The connections of both additional elements are identical and therefore the description thereof is confined to the additional element 25, being equally applicable to the additional element 27.

For the additional supporting element 26 to be hinged to the supporting element 23, the latter is provided with a fork-shaped projection 28 having a hole to receive a pivot pin 29. A projection 30 provided on the additional supporting element 26 is fitted on the pivot pin 29. To provide a guide for the supporting element 23, a bolt 31 is screwed into the supporting element 23 and passed through a hole 32 formed in the supporting element 26. The bolt 31 is retained by a nut 33. Rubber damping elements 34 are mounted on the bolt 31 at the opposite sides of the additional supporting element 26.

If the forces acting on the back side of the saw B are comparatively small, use can be made of a main supporting element 35 (FIG. 8) and two additional supporting elements 36 and 37. The main supporting element 35 has two shaped surfaces 38 and 39 and is fixedly mounted to the lower part 8 (FIG. 2) of the resilient fixture 6. The additional supporting elements 36 and 37 (FIG. 8) are located at the opposite sides of the main supporting element 35, as viewed in the direction of the pitch feed, and are connected therewith.

The additional supporting element 36 has one shaped surface 40 adapted to make contact with the portion $b$ of the back edge of the tooth $a$. The additional supporting element 37 has one shaped surface 41 adapted to make contact with the portion $c$ of the front edge of the tooth $a$.

The additional supporting elements 36 and 37 are connected to the main supporting element 35 by means of stems 42 mounted on the main supporting element 35. The end of each stem 42 is threaded and has a nut 43 screwed thereon. The additional supporting elements 36 and 37 are mounted on the stems 42 so as to be able to make a reciprocating movement. For the purpose springs 44 are mounted on the stems 42 between each of the additional supporting element and the main supporting element.

If the teeth $a$ (FIG. 9) are bent in relation to the side surface of the saw B, use is made of a supporting element 45 with two shaped surfaces 46 (FIG. 10) and 47.

The surface 46 designed to make contact with the portion of the back edge of the tooth $a_1$ is V-shaped. This shape should be used in the cases where the cutting edge of the tooth $a_1$ is perpendicular to the blade of the saw "$B_1$" (angle $\alpha_1 = 90°$).

If the cutting edge of the tooth $a_2$ (FIG. 11) makes an acute angle $\alpha_2$ (FIG. 12) with the blade of the saw $B_2$, the surface 48 provided on the supporting element 49 for the purpose of making contact with the portion of the back edge of the tooth $a_2$, is shaped as an inverted V pointing toward the saw $B_2$.

Fixedly mounted on the bed 1 (FIG. 1) aft of the resilient fixture 6 is a support 50 arranged to make contact with the saw back periodically, i.e. at the end of the saw travel away from the abrasive wheel 3.

The employment of the stop permits strengthening and planishing the portions of the front edges of the saw teeth at high grinding speeds throughout the length of said tooth edge portions without increasing the force exerted by the resilient fixture 6. Furthermore, the use of the stop makes it possible to keep the saw in a floating position.

The stop 50 comprises two parallel shafts 51 (FIG. 13) and 52 fixedly mounted on a support 53 which, in turn, is fixedly mounted on the bed 1 (FIG. 1).

The shaft 52 (FIG. 13) carries a sleeve 54 whose end nearer the support 53 is provided with a shoulder 55. Mounted on the shaft 52 between the sleeve 54 and the support 53 is a spring 56 which serves the purpose of positioning the sleeve 55 on the shaft 52 by means of a bolt 57 in such a manner that the shoulder 55 is away from the saw back by a clearance H equal to or less than the travel of the resilient fixture 6 with the saw B to the abrasive wheel 3.

The stop can also be located between the supporting elements within the saw pitch feed, whereby a torque action on the supporting element 9 will be obviated.

It is also possible to use two stops for limiting the saw movement away from the abrasive wheel. One of the stops should be mounted before and the other after the resilient fixture, as viewed in the direction of the pitch feed. This arrangement also provides against a torque action on the supporting element 9.

To produce a higher density of the surface metal layer on the portions b (FIG. 4) and c of the back and front edges of the tooth a, use is made of a supporting element 60 (FIG. 14) whose shaped surfaces 58 and 59 are corrugated across the direction $S_1$ of the pitch feed.

Each corrugation 61 (FIG. 15) is of half-round cross section. The pitch of the corrugations should suit the length of the tooth edge portion being strengthened. It may be less than, equal to or greater than the length of said portion.

A corrugation pitch less than or equal to the length of the tooth edge portion is employed in grinding fine-pitch saws. For coarse-pitch saws, the pitch of the corrugations should be greater than the length of the tooth edge portion as this in addition to strengthening the surface metal layer, will improve the quality of the planishing action.

For high grinding rates (400–600 teeth per minute), the corrugations should have a varying pitch in order to damp saw vibration. Alternatively, corrugations of various height may be used with a constant pitch.

In another embodiment a supporting element 62 (FIG. 16) has corrugated surfaces 63 and 64, the corrugations having a cross-sectional shape in the form of a scalene triangle the larger side of which faces against the direction $S_1$ of the pitch feed and provides a contact face 65, 66 for the appropriate portion of the tooth to make contact therewith.

All the previous considerations concerning the pitch of the half-round corrugations fully apply to the corrugations shaped as a scalene triangle.

If the surface of the supporting element 9 (FIG. 1) making contact with the tips of the teeth $a$ of the saw B is parallel to the tooth tips, the saw has a swinging movement relative to the supporting element 10 whose shaped surfaces form a wedge. In this case the contact faces 65 (FIG. 16) of the shaped surface 63 making contact with the portion $b$ of the tooth back edge have equal length L, whereas the angle $\beta$ between each succeeding contact fact 65 and the imaginary plane perpendicular to the direction $S_1$ of the pitch feed is less than the angle $\beta$ between the preceding contact face 65 and said plane.

On the shaped surface 64 the contact faces 66 are also of equal length, whereas the angle $\beta_1$ adjacent to the angle $\beta$, i.e. the difference ($180° - \beta$), of each succeeding contact face is less than the angle $\beta_1$ of each preceding contact face 66.

This construction of the shaped surfaces 63 and 64 provides for uniform strengthening of the surface metal layer throughout the length of the appropriate portions of the tooth back and rear edges.

To improve the surface finish in addition to strengthening the surface layer of the metal, the length L of each succeeding contact face 65 and 66 on the appropriate shaped surfaces is slightly greater than the length of the preceding contact faces 65 and 66, whereas the angles $\beta$ and $\beta_1$ of the succeeding contact faces 65 and 66 are slightly less than the angles $\beta$ and $\beta_1$ of the preceding contact faces 65 and 66.

The angles B and $B_1$ are changed so as to maintain a constant angle $\gamma$ between each contact face and the respective tooth edge.

In another embodiment, a supporting element 67 (FIG. 17) has shaped surfaces 70 and 71 with contact faces 68 and 69 respectively. The length of each succeeding contact face, as viewed in the direction of the saw movement, is slightly less than the length of each preceding contact face. The angle $\beta$ between each succeeding contact face 68 of the shaped surface 70 and the imaginary plane perpendicular to the direction S of the pitch feed is slightly greater than the angle between the preceding contact face and said plane, and the angle $\beta_1$ of each succeeding contact face 69 of the shaped surface 71 is slightly greater than the respective angles $\beta$ and $\beta_1$ of the preceding contact faces.

The decrease in the length of the contact faces 68, 69 and the increase in the angles $\beta$ and $\beta_1$ provides for maximum strengthening of the surface metal layer at the cutting edge of the tooth $a$, inasmuch as with each succeeding contact made during the pitch feed with the respective contact face 68 and 69 the length of the portions $b$ (FIG. 4) and $c$ of the edges of the tooth $a$ becomes smaller.

The angles $\beta$ and $\beta_1$ are changed so that the angle between the contact face and the edge of the tooth $a$ increases constantly.

To improve the surface finish (the planishing action), the contact faces may be made so that on each shaped surface the length "L" of each succeeding contact face, as viewed in the direction of the pitch feed, is slightly greater than the length of the preceding contact face, the angles $\beta$ and $\beta_1$ changing in the same manner as described above (i.e. the angles increase).

If the supporting elements mounted on the resilient fixture 6 (FIG. 1) before and after the abrasive wheel, as viewed in the direction of the saw pitch feed, have identical shaped surfaces forming a wedge, the saw B has transverse movements relative to said supporting elements during the pitch feed.

In this case the contact faces of the shaped surfaces of said supporting elements have equal length and make equal angles with the imaginary plane perpendicular to the direction of the pitch feed, which provides for uniform strengthening of the surface metal layer throughout the length of the appropriate portions of the tooth edges. This construction of the contact faces on the shaped surfaces is most advantageous for manufacturing reasons.

To provide for maximum strengthening of the surface metal layer at the tooth cutting edge, the length of each succeeding contact face should be slightly less than the length of the preceding contact face.

A further embodiment features a supporting element 72 (FIG. 18) with shaped surfaces 74 and 74a. The length L of the first and the last, as viewed in the direction of the pitch feed, contact faces 73 and 73a is approximately one and a half times the length $L_1$ of each intermediate contact face. Such a construction of the supporting element simplifies the setting-up of the machine and improves the surface finish of the appropriate portions of the edges of the tooth "a".

If it is required to increase the length of the portions $b$ and $c$ of the front and back edges of the tooth $a$, the second as viewed in the direction of the pitch feed, contact face 75 (FIG. 19) of each shaped surface 76, 77 of the supporting element 78 should be corrugated (the corrugated contact face on the surface 77 in FIG. 19 is not shown since it is identical with the contact face 75).

Each corrugation is triangular and has a sharp top edge for effectively shaving the appropriate portion of the tooth edge. The pitch of the corrugations should not exceed the length of the tooth edge portions "b" and "c" making contact with the shaped surface involved. The corrugations run across the direction of the saw pitch feed.

If the saw B has a swinging movement relative to the supporting element 79 (FIG. 20) located after the abrasive wheel, as viewed in the direction of the pitch feed, the second contact face 80 of the shaped surface 81 making contact with the portion "c" of the tooth front edge should be made as a part of a cylindrical surface with the radius $R_1$ equal to the distance betwen the supporting elements 79 and 9 (FIG. 1) located one before and the other after the abrasive wheel 3, as viewed in the direction $S_1$ of the saw pitch feed. The centre O is offset by the amount 1 with respect to the supporting element 9 in the direction of the saw feed to the abrasive wheel. The pitch of these corrugations is less than the length of the portin "c" of the tooth front edge. The top edges of these corrugations are sharp and in line. This construction of the second contact face 80 of the shaped surface 81 making contact with the portion $c$ of the tooth front edge enables said portion $c$ to contact every corrugation 83 throughout the length of the contact face 80.

To provide for maximum strengthening of the tooth cutting edge (tip) and improvement in the tooth surface finish, the supporting element 82 (FIG. 21) mounted after the abrasive wheel 3, as viewed in the direction $S_1$ of the pitch feed, has a rounded top with corrugations 83. The pitch of said corrugations is slightly greater than the length of the tooth edge portions being strengthened.

This pitch is employed for improving the planishing action on the tooth cutting edge. The pitch of the corrugations may also be less than the length of the tooth edge portions being strengthened. This corrugation pitch is employed on the supporting elements used for grinding band saws of a comparatively fine tooth pitch.

To damp vibrations, it is advisable to employ corrugations of varying pitch.

The band saw grinding machine which constitutes the present invention operates in the following manner:

First the machine is set up. By turning the handle 84 (FIGS. 1 and 2), which is connected with an eccentric 85 located on the lower part 8 of the resilient fixture 6, the fixture upper part 7 and the lever 86, which serves to retard the saw B during the pitch feed, are caused to move upward, turning about pivots 87 and 88. Then the saw "B" is put on the guides of the fixture part 8 and, by using an auxiliary resilient fixture 89, is set so that the tips of the teeth bear on the supporting element 9 and 11. Thereafter the upper part 7 of the resilient fixture 6 is lowered by returning the handle 84 into the initial position. Now the saw B is clamped at the side and back surfaces.

The saw, being held in the resilient fixture 6, is fed therewith to the abrasive wheel 3 in a reciprocating motion. In addition, the supporting element 10 imparts to the saw a reciprocating movement relative to the resilient fixture 6, said movement practically reaching 0.5 – 0.6 of the tooth height. The actual saw travel with the resilient fixture 6 consists of the sum of the tooth height and the saw idle stroke minus a double stroke of the saw relatively to the resilient fixture 6.

Practically the travel of the saw B with the resilient fixture 6 reaches 0.5 of the tooth height.

After the saw B is clamped by the use of a crank gear 90 (FIG. 2), the saw feed to the abrasive wheel 3 is set according to the tooth height. At the same time the saw pitch feed to the abrasive wheel 3 is set.

The saw is set in relation to the supporting element 10 so that the top of said supporting element is in the space between the teeth, the portion $c$ of the tooth front edge contacting the shaped surface 13. During a part of the pitch feed the tip of the tooth goes a little past the top of the supporting element 10 whereupon it goes further by the action of the auxiliary resilient fixture 89, the portion $c$ of the tooth front edge riding on the other shaped surface 13 of the supporting element 10.

The abrasive wheel 3 is set so that its top makes an initial contact with the front edge of the tooth $a$ some distance $m$ (FIG. 3) from the tooth tip. An angle $\lambda$ is formed between the front edge of the tooth "a" and the face of the abrasive wheel 3.

When subsequent saws are put on the guides of the resilient fixture 6, they are automatically orientated by virtue of the supporting element 10 hose top enters the space between the adjacent teeth $a$, the shaped surface 13 (FIG. 3) of the supporting element 10 making contact with the portion $c$ of the tooth front edge.

After the saw is installed and the mechanisms 4 and 5 are set up, the drive (not shown) to said mechanisms is put into action and the grinding mechanism is set into operation to give rotation to the abrasive wheel 3.

During the initial contact between the saw tooth $a$ and the abrasive wheel 3 and during the feed of the saw to the abrasive wheel 3 the grinding is done on the front edge of the tooth. Due to the grinding effort, the saw moves some distance in the direction of the pitch feed and at the same time turns due to said grinding effort by by virtue of the floating position. The same grinding effort causes the portion $c$ of the tooth front edge to leave the shaped surface 13.

The angle $\lambda$ (FIG. 3) gradually decreases and becomes zero at the end of the grinding action on the tooth front edge. In consequence, the layer $f$ of the metal on the portion $m$ of the tooth front edge is removed gradually during the whole period of grinding the front and back edges of the adjacent teeth. With this setting of the abrasive wheel 3, the tip of the tooth $a$ is under the most favorable temperature conditions, which enables the grinding rate to be increased greatly without impairing the quality of the grinding operation.

After the saw gets out of contact with the abrasive wheel 3, it is fed by the amount of the tooth pitch. During a part of the pitch feed, the portion $b$ of the tooth back edge moves on the shaped surface 12 and is thereby strengthened and planished. After the tooth has passed over the top of the supporting element, the action of the auxiliary resilient ficture 89 and stop 50 caused the portion $c$ of the tooth front edge to make contact with the shaped surface 13 during the remaining part of the pitch feed. By moving on the shaped surface 13, the portion $c$ of the tooth front edge becomes strengthened and planished.

The machine works essentially in the same manner when other embodiments of the supporting element described previously herein are used in accordance with the desired mode of operation.

An experimental band saw grinding machine constructed in accordance with the present invention gives a tooth tip surface finish of Class 8–10 and above, depending on the surface finish of the shaped surface of the supporting element. This treatment materially increases saw life.

The machine practically has a zero idle stroke.

The travel of the saw and resilient fixture to the abrasive wheel is much less than the height of the tooth being ground.

I claim:

1. A band saw tooth grinding machine comprising: a bed; a grinding mechanism having an abrasive wheel and mounted on said bed; a mechanism for imparting a reciprocating feed of the saw to the abrasive wheel in order to grind the front and back edges of the saw teeth, said mechanism being mounted on said bed; a mechanism for imparting a pitch feed of the saw to the abrasive wheel, said mechanism being mounted on said reciprocating feed mechanism, the two mechanisms being kinematically interconnected; a resilient fixture arranged to retain the saw at the side and back surfaces and mounted on said reciprocating feed mechanism; at least two supporting elements mounted in said fixture, one of which supporting elements is located before said abrasive wheel, as viewed in the direction of the saw pitch feed, and serving the purpose of successively making contact with the tip of each saw tooth, and the other supporting element is located after said abrasive wheel, as viewed in the direction of the saw pitch feed, and has two shaped surfaces disposed in relation to each other so as to form a wedge; one of said shaped surfaces of said other supporting element successively making contact with each tooth on the portion of its back edge adjacent to the tooth tip during a part of the saw pitch feed, whereby the saw is retarded and at the same time said portion of the tooth back edge is strengthened and planished; the other shaped surface of said other supporting element being included at an acute angle with respect to a line passing through the tips of the teeth and successively making contact with each tooth on the portion of its front edge adjacent to the tooth tip during the remaining part of the saw pitch feed, whereby said portion of the front edge of each tooth is strengthened and planished, and drive means for driving said mechanisms.

2. A band saw tooth grinding machine comprising: a bed; a grinding mechanism having an abrasive wheel and mounted on said bed; a mechanism for imparting a reciprocating feed of the saw to the abrasive wheel in order to grind the front and back edges of the saw teeth, said mechanism being mounted on said bed; a mechanism for imparting a pitch feed of the saw to the abrasive wheel, said mechanism being mounted on said reciprocating feed mechanism, the two mechanisms being kinematically interconnected; a resilient fixture arranged to retain the saw at the side and back surfaces and mounted on said reciprocating feed mechanism; at least two supporting elements mounted in said fixture, one of which supporting elements is located before said abrasive wheel, as viewed in the direction of the saw pitch feed, and serving the purpose of successively making contact with the top of each saw tooth, and the other supporting element is located after said abrasive wheel, as viewed in the direction of the saw pitch feed, and has two shaped surfaces disposed in relation to each other so as to form a wedge; one of said shaped surfaces of said other supporting element successively making contact with each tooth on the portion of its back edge adjacent to the tooth tip during a part of the saw pitch feed, whereby the saw is retarded and at the same time said portion of the tooth back edge is strengthened and planished; the other shaped surface of said other supporting element successively making contact with each tooth on the portion of its front edge adjacent to the tooth tip during the remaining part of the saw pitch feed, whereby said portion of the front edge of each tooth is strengthened and planished, and drive means for driving said mechanisms, the supporting element with shaped surfaces being mounted so that it can make a reciprocating movement in the direction of the saw pitch feed.

3. A band saw tooth grinding machine comprising: a bed; a grinding mechanism having an abrasive wheel and mounted on said bed; a mechanism for imparting a reciprocating feed of the saw to the abrasive wheel in order to grind the front and back edges of the saw teeth, said mechanism being mounted on said reciprocating feed mechanism, the two mechanisms being kinematically interconnected; a resilient fixture arranged to retain the saw at the side and back surfaces and mounted on said reciprocating feed mechanism; at least two supporting elements mounted in said fixture, one of which supporting elements is located before said abrasive wheel, as viewed in the direction of the saw pitch feed, and serving the purpose of successively making contact with the tip of each saw tooth, and the other supporting element is located after said abrasive wheel, as viewed in the direction of the saw pitch feed, and has two shaped surfaces disposed in relation to each other so as to form a wedge; one of said shaped surfaces of said other supporting element successively making contact with each tooth on the portion of its back edge adjacent to the tooth tip during a part of the saw pitch feed, whereby the saw is retarded and at the same time said portion of the tooth back edge is strengthened and planished; the other shaped surface of said other supporting element successively making contact with each tooth on the portion of its front edge adjacent to the tooth tip during the remaining part of the saw pitch feed, whereby said portion of the front edge of each tooth is strengthened and planished, and drive means for driving said mechanisms, said machine further comprising two additional supporting elements with shaped surfaces, said additional supporting elements being located at the opposite sides, as viewed in the direction of the saw pitch feed, of a main supporting element with shaped surfaces and articulated thereto, said main supporting element being fixedly mounted on the resilient fixture.

4. A band saw tooth grinding machine comprising: a bed; a grinding mechanism having an abrasive wheel and mounted on said bed; a mechanism for imparting a reciprocating feed of the saw to the abrasive wheel in order to grind the front and back edges of the saw tooth, said mechanism being mounted on said bed; a mechanism for imparting a pitch feed of the saw to the abrasive wheel, said mechanism being mounted on said reciprocating feed mechanism, the two mechanisms being kinematically interconnected; a resilient fixture arranged to retain the saw at the side and back surfaces and mounted on said reciprocating feed mechanism; at least two supporting elements mounted in said fixture, one of which supporting elements is located before said abrasive wheel, as viewed in the direction of the saw pitch feed, and serving the purpose of successively making contact with the tip of each saw tooth, and the other supporting element is located after said abrasive wheel, as viewed in the direction of the saw pitch feed, and has two shaped surfaces disposed in relation to each other so as to form a wedge; one of said shaped surfaces of said other supporting element successively making contact with each tooth on the portion of its back edge adjacent to the tooth tip during a part of the saw pitch feed, whereby the saw is retarded and at the same time said portion of the tooth back edge is strengthened and planished; the other shaped surface of said other supporting element successively making contact with each tooth on the portion of its front edge adjacent to the tooth tip during the remaining part of the saw pitch feed, whereby said portion of the front edge of each tooth is strengthened and planished, and drive means for driving said mechanisms, said machine further comprising two additional supporting elements located at the opposite sides, as viewed in the direction of the saw pitch feed, of a main supporting element with shaped surface, which main supporting element is fixedly mounted on the resilient fixture, said additional supporting elements being connected to said main supporting element so that they can make a reciprocating movement relative thereto in the direction of the saw pitch feed; the additional supporting element located before the main supporting element having a shaped surface adapted to make contact with the appropriate portion of the tooth back edge; the additional supporting element located after the main supporting element having a shaped surface adapted to make contact with the appropriate portion of the tooth front edge.

5. A band saw tooth grinding machine comprising: a bed; a grinding mechanism having an abrasive wheel and mounted on said bed; a mechanism for imparting a reciprocating feed of the saw to the abrasive wheel in order to grind the front and back edges of the saw teeth, said mechanism being mounted on said bed; a mechanism for imparting a pitch feed of the saw to the abrasive wheel, said mechanism being mounted on said reciprocating feed mechanism, the two mechanisms being kinematically interconnected; a resilient fixture arranged to retain the saw at the side and back surfaces and mounted on said reciprocating feed mechanism; at least two supporting elements mounted in said fixture, one of which supporting elements is located before said abrasive wheel, as viewed in the direction of the saw pitch feed, and serving the purpose of successively making contact with the tip of each saw tooth, and the other supporting element is located after said abrasive wheel, as viewed in the direction of the saw pitch feed, and has two shaped surfaces disposed in relation to each other so as to form a wedge; one of said shaped surfaces of said other supporting element successively making contact with each tooth on the portion of its back edge adjacent to the tooth tip during a part of the saw pitch feed, whereby the saw is retarded and at the same time said portion of the tooth back edge is strengthened and planished; the other shaped surface of said other supporting element successively making contact with each tooth on the portion of its front edge adjacent to the tooth tip during the remaining part of the saw pitch feed, whereby said portion of the front edge of each tooth is strengthened and planished, and drive means for driving said mechanisms, the shaped surface provided on the supporting element for the purpose of contacting the appropriate portion of the tooth back edge being V-shaped.

6. A band saw tooth grinding machine comprising: a bed; a grinding mechanism having an abrasive wheel and mounted on said bed; a mechanism for imparting a reciprocating feed of the saw to the abrasive wheel in order to grind the front and back edges of the saw teeth, said mechanism being mounted on said bed; a mechanism for imparting a pitch feed of the saw to the abrasive wheel, said mechanism being mounted on said reciprocating feed mechanism, the two mechanisms being kinematically interconnected; a resilient fixture arranged to retain the saw at the side and back surfaces and mounted on said reciprocating feed mechanism; at least two supporting elements mounted in said fixture, one of which supporting elements is located before said abrasive wheel, as viewed in the direction of the saw pitch feed, and serving the purpose of successively making contact with the tip of each saw tooth, and the other supporting element is located after said abrasive wheel, as viewed in the direction of the saw pitch feed, and has two shaped surfaces disposed in relation to each other so as to form a wedge; one of said shaped surfaces of said other supporting element successively making contact with each tooth on the portion of its back edge adjacent to the tooth tip during a part of the saw pitch bed, whereby the saw is retarded and at the same time said portion of the tooth back edge is strengthened and planished; the other shaped surface of said other supporting element successively making contact with each tooth on the portion of its front edge adjacent to the tooth tip during the remaining part of the saw pitch feed, whereby said portion of the front edge of each tooth is strengthened and planished, and drive means for driving said mechanisms, said machine further comprising a stop mounted on the bed within the saw pitch feed movement arranged to periodically make contact with the back surface of the saw in order to limit the movement of the saw away from the abrasive wheel.

7. A machine as claimed in claim 6, in which the stop is located on the bed after the resilient fixture, as viewed in the direction of the saw pitch feed.

8. A band saw tooth grinding machine comprising: a bed; a grinding mechanism having an abrasive wheel and mounted on said bed; a mechanism for imparting a reciprocating feed of the saw to the abrasive wheel in order to grind the front and back edges of the saw teeth, said mechanism being mounted on said bed; a mechanism for imparting a pitch feed of the saw to the abrasive wheel, said mechanism being mounted on said reciprocating feed mechanism, the two mechanisms being kinematically interconnected; a resilient fixture arranged to retain the saw at the side and back surfaces and mounted on said reciprocating feed mechanism; at least two supporting elements mounted in said fixture, one of which supporting elements is located before said abrasive wheel, as viewed in the direction of the saw pitch feed, and serving the purpose of successively making contact with the tip of each saw tooth, and the other supporting element is located after said abrasive wheel, as viewed in the direction of the saw pitch feed, and has two shaped surfaces disposed in relation to each other so as to form a wedge; one of said shaped surfaces of said other supporting element successively making contact with each tooth on the portion of its back edge adjacent to the tooth tip during a part of the saw pitch feed, whereby the saw is retarded and at the same time said portion of the tooth back edge is strengthened and planished; the other shaped surface of said other supporting element successively making contact with each tooth on the portion of its front edge adjacent to the tooth tip during the remaining part of the saw pitch feed, whereby said portion of the front edge of each tooth is strengthened and planished, and drive means for driving said mechanisms, each shaped surface of the supporting element having corrugations positioned across the direction of the saw pitch feed.

9. A machine as claimed in claim 8, in which each corrugation is of half-round cross section.

10. A band saw tooth grinding machine comprising: a bed; a grinding mechanism having an abrasive wheel and mounted on said bed; a mechanism for imparting a reciprocating feed of the saw to the abrasive wheel in order to grind the front and back edges of the saw teeth; said mechanism being mounted on said bed; a mechanism for imparting a pitch feed of the saw to the abrasive wheel, said mechanism being mounted on said reciprocating feed mechanism, the two mechanisms being kinematically interconnected; a resilient fixture arranged to retain the saw at the side and back surfaces and mounted on said reciprocating feed mechanism; at least two supporting elements mounted on said fixture, one of which supporting elements is located before said abrasive wheel, as viewed in the direction of the saw pitch feed, and serving the purposes of successively making contact with the tip of each saw tooth, and the other supporting element is located after said abrasive wheel, as viewed in the direction of the saw pitch feed; and has two shaped surfaces disposed so as to form a wedge; each of the shaped surfaces of the other supporting element being corrugated across the direction of the saw pitch feed, the cross-sectional shape of the corrugations being in the form of a scalene triangle the larger side of which faces against the direction of the saw pitch feed and provides a contact face for the saw teeth to make contact therewith; one of said shaped surfaces of said other supporting element successively making contact with each tooth on the portion of its back edge adjacent to the tooth tip during a part of the saw pitch feed, whereby the saw is retarded and at the same time said portion of the tooth back edge is strengthened and planished; the other shaped surface of said other supporting element successively making contact with each tooth on the portion of its front edge adjacent to the tooth tip during the remaining part of the saw pitch feed, whereby said portion of the front edge of each tooth is strengthened and planished; and drive means for driving said mechanism.

11. A machine as claimed in claim 10, in which the contact faces of each shaped surface have equal lengths, whereas the angle between each succeeding contact face and the imaginary plane perpendicular to the direction of the saw pitch feed is less than the angle between the preceding contact face and said plane.

12. A machine as claimed in claim 10, in which the length of each succeeding contact face of each shaped surface is slightly greater than the length of the preceding contact face, whereas the angle between each succeeding contact face and the imaginary plane perpendicular to the direction of the saw pitch feed is less than the angle between the preceeding contact face and said plane.

13. A machine as claimed in claim 10, in which the length of each succeeding face, as viewed in the direction of the saw pitch feed, of each shaped surface is slightly less than the length of the preceding contact face, whereas the angle between each succeeding contact face and the imaginary plane perpendicular to the direction of the saw pitch feed is slightly greater than the angle between the preceding contact face and said plane.

14. A machine as claimed in claim 10, in which the contact faces of each shaped surface have equal lengths and make equal angles with the imaginary plane perpendicular to the direction of the saw pitch feed.

15. A machine as claimed in claim 10, in which the length of the first and the last contact faces, as viewed in the direction of the saw pitch feed, is approximately one and half times the length of each intermediate contact face.

16. A machine as claimed in claim 10, in which the second contact faces, as viewed in the direction of the saw pitch feed, of each shaped surface is corrugated, the pitch of the corrugations not exceeding the length of the tooth edge portions making contact with the appropriate shaped surface of the supporting element, which corrugations are positioned across the direction of the saw pitch feed and are triangular in cross section.

17. A machine as claimed in claim 10, in which the second contact face of the shaped surface making contact with the appropriate portion of the tooth front edge has a radius of curvature substantially equal to the distance between the supporting elements, the center being offset in the direction of the saw feed to the abrasive wheel with respect to the supporting element located before the abrasive wheel, as viewed in the direction of the saw pitch feed.

18. A machine as claimed in claim 10, in which the top of the supporting element is rounded and has corrugations positioned across the direction of the saw pitch feed, the pitch of said corrugations being substantially equal to the length of the tooth edge portion making contact with the shaped surface of the supporting element.

* * * * *